Oct. 31, 1961     M. A. USAB     3,006,602
OFFSET STEM BALL VALVE
Filed April 25, 1958

MARTIN A. USAB
INVENTOR.

BY John Joseph Hall
ATTORNEY.

United States Patent Office 3,006,602
Patented Oct. 31, 1961

3,006,602
OFFSET STEM BALL VALVE
Martin A. Usab, Costa Mesa, Calif., assignor, by mesne assignments, to Consolidated Thermoplastics Company, Stamford, Conn., a corporation of Delaware
Filed Apr. 25, 1958, Ser. No. 730,990
3 Claims. (Cl. 251—315)

This invention relates to improvements in the design of ball valves. In the past, an important problem involved with such valves was providing means of support and holding the sections of the ball valve together. Another problem was providing take up means to compensate for wear of the parts of the valve while in operation.

My invention provides for an offset stem in a ball valve as a solution to the above mentioned problems. The offset stem permits the use of two hemispheric body sections which can be easily clamped together and supported. This also provides for easy alignment of the parts. My design further lends itself to low cost production of parts, and comparatively inexpensive materials such as plastics may be used. Further, the spherical construction of the valve allows much higher stress loading on the valve for a given amount of material. Thus, this valve, being spherical, can be made much smaller and lighter for a given purpose than other types of valves. The radial clamp method, allowed by the spherical design, performs the dual function of holding the two hemispheres together and providing take up means to compensate for wear in the valve.

My design also incorporates the same features found in conventional ball valves in providing full round flow of material through the valve, quick acting control of flow, and unbalanced pressure sealing of the ball in conjunction with the ball seals.

It is an object of my invention to provide for a ball valve with an offset stem to permit easy methods of holding valve sections together as well as support of the valve.

Another object of my invention is to provide a valve which is easy to assembly and disassemble in the field.

A further object of my invention is to provide a valve which can be manufactured at low cost using inexpensive materials and methods of manufacture.

A still further object of my invention is to provide a valve which is smaller in size and lighter in weight due to its design for a given purpose than conventional valves.

Figure 1:
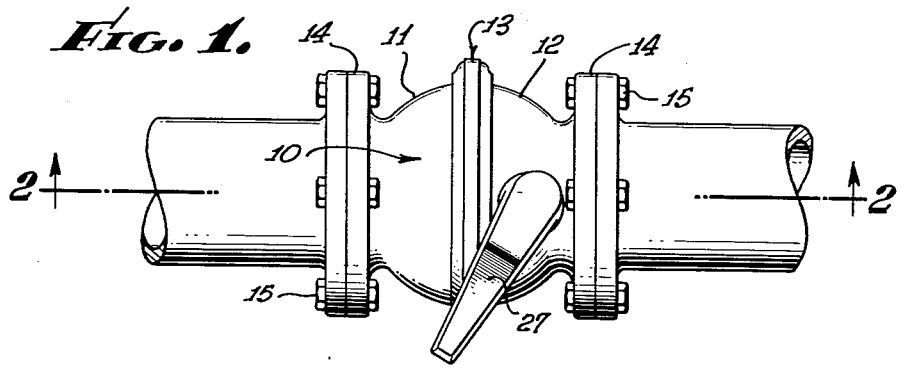
Figure 2:
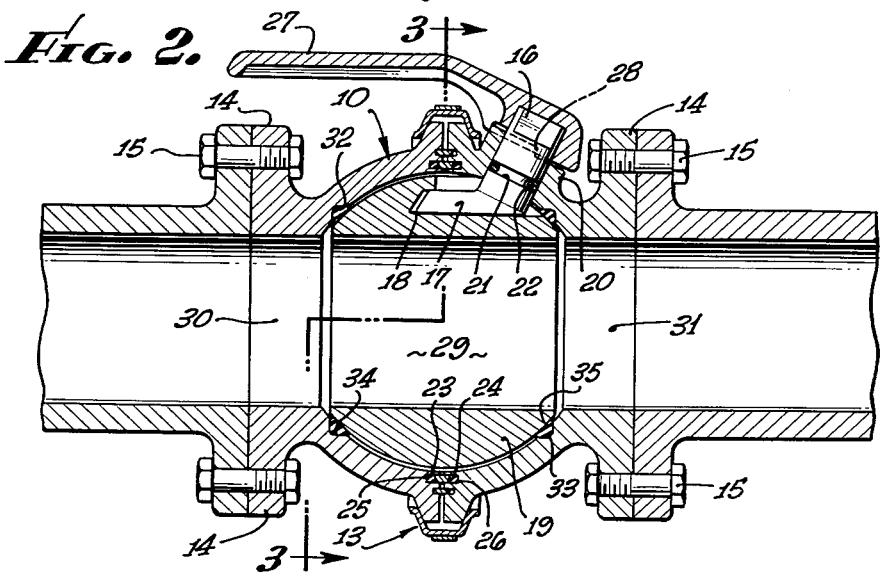
Figure 3:
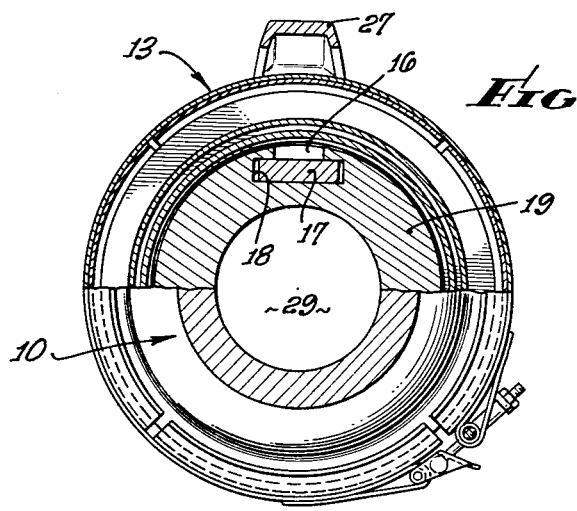

These and other objects will be more readily understood by reference to the following description and claims, taken in conjunction with the accompanying drawing forming a part hereof, in which FIGURE 1 is a plan view of the assembled valve.
FIGURE 2 is a longitudinal section along line 2—2 of FIGURE 1.
FIGURE 3 is a cross section along line 3—3 of FIGURE 2 partly in section and elevation.

The valve body 10 consists of two hemispheric sections 11 and 12 held together by the ring type clamp 13. The flanges 14 permit easy connection of the valve body to piping by means of nuts and bolts 15. The offset stem 16 has a key 17 in its lower end fitting into a key slot 18 in the ball 19. The offset stem 16 forms an angle of approximately 25 degrees from the perpendicular, but the amount of angle is not critical within reason and may be varied without detracting from the features of my invention.

The stem boss 20 provides support for the stem and may be incorporated in either hemisphere along with the stem.

To prevent leakage of material out of the stem boss 20, a circular groove 21 in the stem is adapted to receive an O-ring or other type seal 22. Leakage of material from the valve body 10 is prevented by O-ring or other type seals 23 and 24 inserted in grooves 25 and 26 in the respective hemispheric sections.

Rotation of the offset stem 16 by the valve handle 27 is limited between extreme open and closed positions of the valve by handle stop cut outs 28 of the top portion of the stem boss 20.

The valve ball 19 has the same axis of revolution as the stem 16. Thus, a turn of more than 90 degrees is required to control the passage of material through the valve. The ball 19 is bored to produce a flow passage 29 which is registerable with the longitudinal openings 30 and 31 of the hemispheric sections.

Recesses 32 and 33 of each hemispheric section are adapted to receive removable annular ball seals 34 and 35. Easy alignment of the valve and adjustment for wear is provided by tightening or otherwise adjusting the ring type clamp 13.

While I have described my invention in detail with reference to the accompanying drawing illustrating the preferred form of my invention, it is understood that numerous changes in the details of construction and arrangement of parts may be made without departing from the spirit and scope of the invention as hereinafter claimed.

I claim:
1. In a ball valve, the combination of: a valve body having first and second housing sections and means for joining said sections in assembled relationship to define a spherical valve chamber, said first and second sections having aligned inlet and outlet passages respectively communicating with the chamber, said means for joining providing for rotation of the sections relative to each other about the axis of said passages, one of said sections having a radial opening therethrough at an oblique angle to said axis; a ball having a stem slidably inserted into said radial opening from within said chamber, said ball having a passage therethrough for alignment with said inlet and outlet passages, said stem being rotatably mounted in said opening for movement of said ball between open and closed positions of the valve; and first and second annular gaskets carried in said first and second housing sections respectively for contacting said ball in sealing engagement and positioning said ball within said chamber.

2. In a ball valve, the combination of: a valve body having first and second housing sections and means for joining said sections in assembled relationship to define a spherical valve chamber, said first and second sections having aligned inlet and outlet passages respectively communicating with the chamber, said means for joining providing for rotation of the sections relative to each other about the axis of said passages, one of said sections having a radial opening therethrough at an oblique angle to said axis; a ball having a stem slidably inserted into said radial opening from within said chamber permitting translating motion of said ball along the axis of said stem, said ball having a passage therethrough for alignment with said inlet and outlet passages, said stem being rotatably mounted in said opening for movement of said ball between open and closed positions of the valve; means for rotating said ball about the axis of said stem; and first and second annular gaskets carried in said first and second housing sections respectively for contacting said ball in sealing engagement and positioning said ball within said chamber.

3. In a ball valve, the combination of: a valve body having first and second housing sections and means for joining said sections in assembled relationship to define a spherical valve chamber, said first and second sections having aligned inlet and outlet passages respectively communicating with said chamber, said means for joining providing for rotation of the sections relative to each other about the axis of said passages, one of said sections having a radial opening therethrough at an oblique angle to said axis; a stem projecting into said radial opening from within said chamber and being rotatably mounted in said opening, said stem having a key projecting into said chamber; a ball having a key slot for slidingly receiving said key of said stem with said stem supporting said ball within said chamber, said ball having a passage therethrough for alignment with said inlet and outlet passages; and first and second annular gaskets carried in said first and second housing sections respectively for contacting said ball in sealing engagement and centering said ball within said chamber.

References Cited in the file of this patent

UNITED STATES PATENTS

| | | |
|---|---|---|
| 1,279,900 | Pearsall | Sept. 24, 1918 |
| 1,784,381 | O'Stroske | Dec. 9, 1930 |
| 2,086,001 | Shaw | July 6, 1937 |
| 2,729,238 | Hite | Jan. 3, 1956 |
| 2,788,016 | Scherer | Apr. 9, 1957 |
| 2,792,196 | Clade | May 14, 1957 |

FOREIGN PATENTS

| | | |
|---|---|---|
| 6,113 | Great Britain | May 18, 1831 |
| 716,610 | Great Britain | Oct. 13, 1954 |